United States Patent [19]

Martin

[11] 4,019,712
[45] Apr. 26, 1977

[54] POSITIVE CLOSURE SYSTEM FOR FREE FLOATING DISC VALVE

[75] Inventor: Harry F. Martin, Media, Pa.

[73] Assignee: Westinghouse Electric Corporation, Pittsburgh, Pa.

[22] Filed: Feb. 26, 1976

[21] Appl. No.: 661,590

Related U.S. Application Data

[63] Continuation of Ser. No. 469,930, May 14, 1974, abandoned.

[52] U.S. Cl. .................................. 251/26; 251/44
[51] Int. Cl.² ..................................... F16K 31/122
[58] Field of Search ................. 251/43, 44, 45, 46, 251/26; 137/491

[56] References Cited

UNITED STATES PATENTS

| | | |
|---|---|---|
| 2,032,261 | 3/1936 | Grove .................................. 137/491 |
| 2,759,488 | 8/1956 | Garrett et al. ........................ 251/43 |
| 2,833,299 | 5/1958 | Marriette .............................. 251/43 |
| 3,172,420 | 3/1965 | Brown et al. ......................... 251/43 |
| 3,206,158 | 9/1965 | Bloomquist .......................... 251/43 |
| 3,820,444 | 6/1974 | Ward .................................... 251/43 |

Primary Examiner—Martin P. Schwadron
Assistant Examiner—G. L. Walton
Attorney, Agent, or Firm—G. H. Telfer

[57] ABSTRACT

A free floating disc valve having a positive closure arrangement thereon. A containment vessel enclosing a volume communicable with a pressure chamber is disposed above the valve disc and permits introduction into the pressure chamber of a high pressure fluid entrapped within the containment volume to provide a force to assist the seating of the valve disc.

2 Claims, 2 Drawing Figures

POSITIVE CLOSURE SYSTEM FOR FREE FLOATING DISC VALVE

This is a continuation of application Ser. No. 469,930, filed May 14, 1974, now abandoned.

BACKGROUND OF THE INVENTION

1. Field of the Invention

This invention relates to free floating disc valves; and, in particular, to a positive closure arrangement for such a valve.

2. Description of the Prior Art

A nuclear steam turbine power plant generally consists of a closed-loop series connection comprising a steam generator element, a high pressure turbine element, a moisture separator and reheater element, a low pressure turbine element and a condenser. Between the steam generator element and the high pressure turbine there is disposed a main turbine stop valve and a main turbine throttle valve. These valves control the flow of high pressure, high temperature motive fluid produced within the steam generator element into the remainder of the series connected power plant loop.

The main stop valve and throttle valve are utilized in emergency situations to interdict the flow of steam into the rest of the power plant system. By rapidly closing the stop and throttle valves no further quantity of motive fluid is permitted to enter the turbine elements downstream of the valves. However, steam which has already passed through the main turbine stop and throttle valves and expands through the system has the possibility of overspeeding the turbine elements within the power plant. Thus, if an emergency situation, such as a loss of load condition were to develop, the main turbine stop and throttle valves would close, but steam trapped in the system must still expand therethrough into the condenser. The passage of steam through the low pressure turbine element would, for example, only exacerbate an overspeed condition and increase the possibility of turbine failure.

For this purpose, at least one steam pressure relief, or dump, valve is disposed between the moisture separator reheater element and the low pressure turbine. The dump valve permits venting of steam trapped downstream of the main turbine stop and throttle valves directly to the condenser element or into atmosphere.

The dump valve is usually a free floating disc type valve which is activated by controlling pressures in a pressure chamber above the disc. When the disc is closed, a pilot valve completely seals the pressure chamber and permits equalization of pressures above and below the disc. Decreasing the pressure above the disc, by the expedient of venting the pressure chamber to atmosphere to the condenser, permits the high pressure steam on the inlet side of the valve disc to exert a force tending to raise the valve disc. Thus, steam passes through the dump valve either to the condenser or to atmosphere.

It is possible, however, for friction between a seal arrangement surrounding the valve disc and the interior portions of the chamber housing to prevent the valve disc from responding to a closing signal impressed thereon by suitable governor means. The usual method of closing dump valves is to re-isolate the pressure chamber by closing of the pilot valve and letting the pressures above and below the valve disc equalize. The weight of the valve, plus any force unbalance due to a different in effective areas on the upper and lower surfaces of the disc, are usually sufficient to overcome the frictional force generated between the seals and the valve chamber walls.

However, when utilizing a prior art free floating disc valve in a nuclear steam power plant which generally operates at lower steam pressures than the conventional fossil fuel plant, reliance upon the weight of the disc and the pressure unbalance is not always sufficent to overcome the frictional force. Thus, the free floating disc within the dump valve may not predictably re-seat and disruption to the entire power plant system will occur. It is therefore advantageous to provide a positive closure system for a free floating disc type valve to insure proper seating of the valve disc when the pressure relief function has been performed.

SUMMARY OF THE INVENTION

This invention provides a pressure containment vessel enclosing a volume therein communicating with a pressure chamber disposed within the valve housing of a free floating disc type pressure relief valve. The containing volume allows accumulation of high pressure fluid therein when the valve disc is in the closed, or seated position, and entraps that fluid therein through the use of suitable control means when the disc is opened. To ensure positive closing of the valve disc, communication is reestablished between the pressure chamber and the containment volume. The introduction of the high pressure fluid entrapped within the containment volume into the pressure chamber above the valve disc exerts a sufficient closing force on the valve disc to ensure proper seating.

It is an object of this invention to provide a free floating disc type valve having thereon a closing arrangement so as to insure positive closure of the valve disc after performance of the pressure relief function.

It is desirable, and hence a further object of this invention, to provide a positive closure system for a free floating disc valve so as to eliminate any possibility of atmospheric air entering the condenser element of a steam turbine power plant, which possibility is increased if the valve disc did not properly seat.

BRIEF DESCRIPTION OF THE DRAWINGS

The invention will be more fully understood from the following detailed description of the preferred embodiments, taken in connection with the accompanying drawings, in which.

DESCRIPTION OF THE PREFERRED EMBODIMENT

Figure 1:
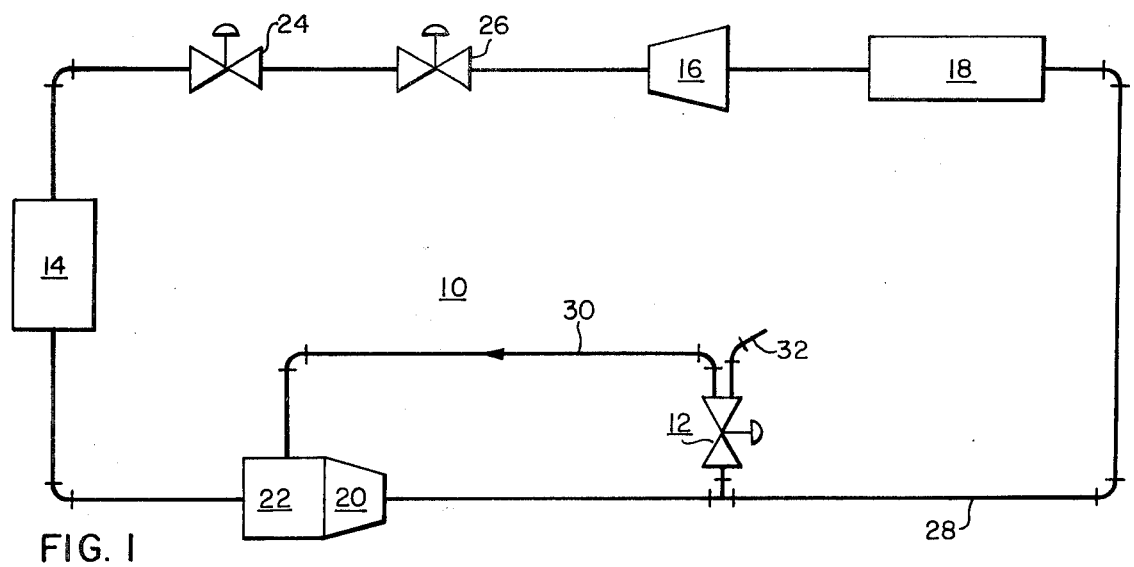
FIG. 1 is a diagrammatic view showing the location of the free floating disc valve embodying the teachings of this invention in a nuclear steam power plant system.

Throughout the following description, similar reference numerals refer to similar elements in all figures of the drawings Referring first to FIG. 1, a nuclear steam power plant 10 disposing a free floating disc type dump valve 12 embodying the teachings of this invention is diagrammatically shown. The power plant 10 is comprised of a closed-loop series connection having a steam generator element 14 connected to a high pressure turbine element 16, a moisture separator-reheater element 18, a low pressure turbine element 20, and a condenser element 22. The condenser element 22 is usually maintained at pressures below that of atmosphere.

Intermediate between the steam generator element 14 and the high pressure element 16 is a main turbine stop valve 24 and a main turbine control valve 26. The stop valve 24 and the control valve 26 are normally open valves able to a close quickly to interdict any flow of high pressure motive fluid passing from the steam generator element 14 into the high pressure turbine element 16 and other elements of the power plant 10 downstream of the high pressure turbine element 16. If, during an emergency situation, it becomes necessary to prevent the flow of motive fluid from entering the closed-loop series arrangement of the power plant 10, the valves 24 and 26 close in response to a trip signal from a valve control means (not shown).

However, interdiction of the supply of motive fluid into the power plant 10 is not the only requirement that is necessitated by an emergency condition. For, if steam already downstream of the stop valve 24 and the throttle valve 26 were permitted to expand through the rest of the system 10, problems, such as damage to the low pressure turbine element 20 due to excessive centrifugal force impressed thereon, could occur.

For this reason, at least one dump valve 12 is connected in a conduit line 28 between the moisture separator-reheater element 18 and the low pressure turbine element 20. The dump valve 12 is connected within the system so that steam trapped downstream of the main turbine stop valve 24 and the control valve 26 is permitted an alternate escape route through the dump valve 12 either to the condenser element 22, indicated by reference arrow 30, or directly to atmosphere, as indicated by reference numeral 32.

Figure 2:
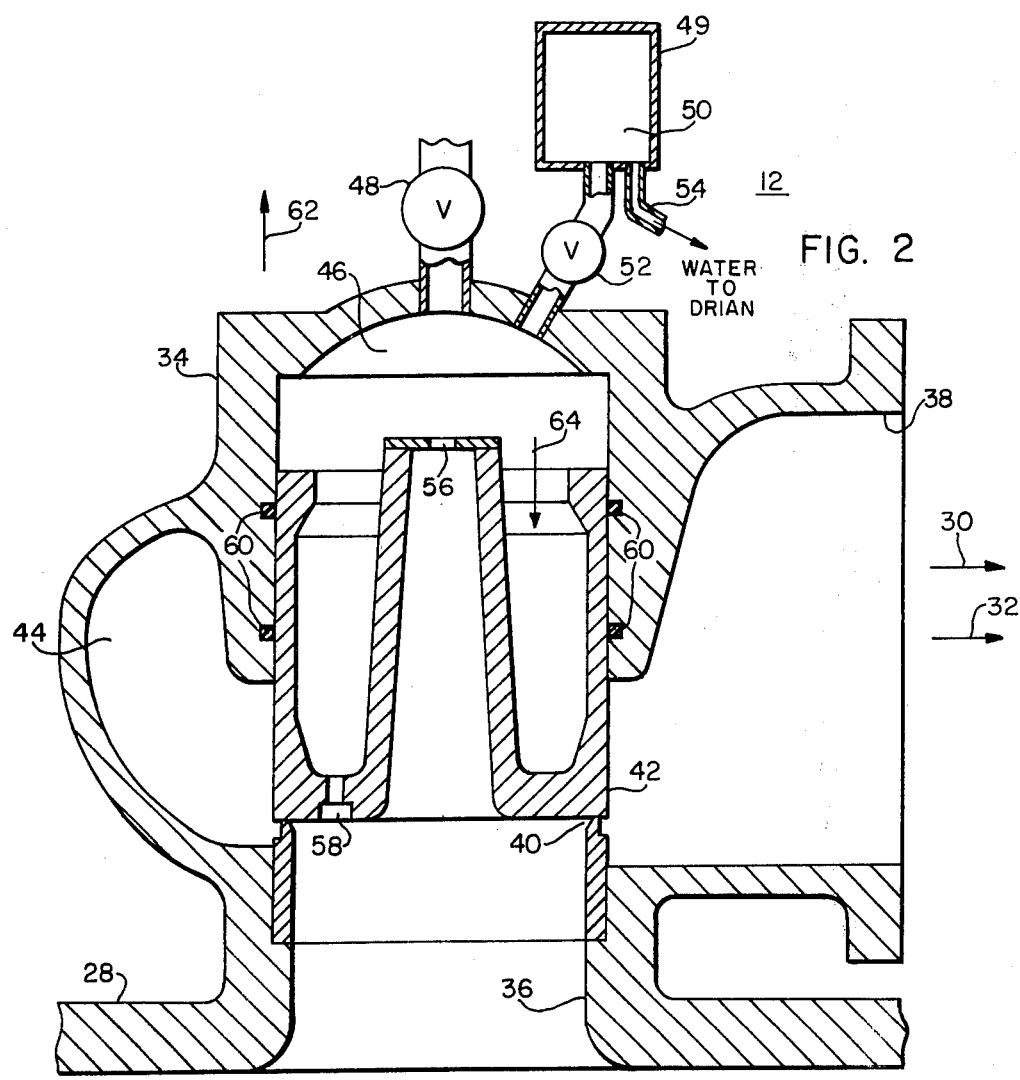
FIG. 2 is an elevation view entirely in section showing a free floating disc valve embodying the teachings of this invention.

Referring now to FIG. 2, the valve 12 is shown in an elevational view entirely in section and is connected within the conduit line 28 between the moisture separator-reheater element 18 and the low pressure turbine element 20 (FIG. 1).

The valve 12 is comprised of a body member, or valve housing 34, which has inlet 36 and outlet 38 disposed therein. A valve seat 40 is disposed circumferentially about that portion of the valve housing 34 adjacent the inlet 36. The outlet 36 is connected either to the dump line 30, which communicates with the condenser element 22, or is vented directly to atmosphere, as indicated by reference arrow 32.

A valve disc 42 is reciprocally movable within the body member 34 away from the valve seat 40 so as to permit communication between the inlet 36 and the outlet 38. A valve chamber 44 circumferentially surrounds the valve disc 42 and communicates both with the inlet 36 and the outlet 38.

The interior of the valve housing 34 defines a pressure chamber 46 disposed above the valve disc 40. The pressure chamber 46 is connected to a low pressure region, such as the condenser 22, through a first control valve 48. As will be made clear from the description herein, the pressure chamber 46 communicates through the first valve 48 with a region having a pressure, at initiation of the dump valve, that is lower than the lowest pressure which appears within the pressure chamber 46. An object of this invention is to eliminate the possibility of air entering the condenser element 22 (FIG. 1) if the disc 42 did not properly seat. Air entering the condenser 22 would produce a rapid rise in condenser pressure which could damage the low pressure turbine element 20 (FIG. 1). It is understood that the pressures utilized within the closure system herein described may be chosen as being below atmospheric pressure.

A pressure containment vessel 49 encloses a containment volume 50 communicating with the pressure chamber 46 through a second control valve 52. The first control valve 48 and the second control valve 52 are alternatively operated by suitable control means (not shown). By this it is meant that when the first valve 48 is in the open position so as to permit communication between the pressure chamber 46 and the low pressure region, the second control valve 52 is closed so as to isolate the pressure containment volume 50 from the pressure chamber 46. However, when the first control valve 48 is closed so as to isolate the pressure chamber 46 from the low pressure region, the second control valve 52 is open so as to permit communication between the pressure containment volume 50 and the pressure chamber 46. A drain 54 is connected to the pressure containment volume 50. The drain 54 is disposed so as to provide a path for any condensate which may develop within the containment volume 50.

The valve disc 42 has an opening 56 extending through the valve disc 42 through which the pressure chamber 46 above the valve disc 42 communicates with the region beneath the valve disc 42 adjacent the valve inlet 36. O-ring seals 60 are disposed circumferentially about the interior of the valve housing 34 and prevent leakage from the region adjacent the valve inlet 36 into the pressure chamber 46 past the valve disc 42. A drain 58 provides a path for relief of any condensate which develops within the pressure chamber 46. It is desirable to have such a condensate drain disposed indepenent of communication opening 56.

In operation, the free floating disc valve 12 is normally closed. When closed, steam passes within the conduit 28 from the moisture separator-reheater element 18 into the low pressure turbine element 20. If an emergency should develop, the valves 24 and 26 interdict the flow of high pressure steam from the steam generator element 14 into the rest of the nuclear steam turbine power plant 10. However, steam trapped downstream of the valves 24 and 26 would cause an overspeed condition if it were permitted to expand therethrough. Therefore, the dump valve 12 is opened to permit venting of the steam trapped within the power plant system downstream of the stop valve 24 and throttle valve 26.

When the valve disc 42 is closed, the first control valve 48 is closed and the second control valve 52 is opened. Thus, when the valve disc 42 is seated, the pressure chamber 46 is isolated from the low pressure region (not shown) and the pressure containment volume 50 communicates with the pressure chamber 46. High pressure fluid in the region beneath the valve disc 42 adjacent the valve inlet 36 enters the isolated pressure chamber 46 through openings 56 and 58. Over a period of time, the pressure within the pressure chamber 46 above the valve disc 42 approximately equals the pressure beneath the valve disc 42 in the region adjacent the inlet 36. Since the force unbalance above and below the valve disc 42 is approximately zero, the weight of the valve disc 42 maintains that disc in a seated position against the valve seat 40. Thus, the valve inlet 36 is isolated from the valve outlet 38. While the valve disc 42 is closed high pressure fluid is also accumulated within the pressure containment volume 50 which communicates with the pressure chamber 46 through the open second control valve 52.

Upon receipt of the emergency trip signal from the control means (not shown), the settings of the control valves 48 and 52 are alternated. That is, the first control valve 48 is open so as to permit communication between the pressure chamber 46 and the low pressure region (not shown), and the second control valve 52 is closed so as to isolate the pressure containment volume 50 from the pressure chamber 46. With the first control valve 48 open, the accumulation of high pressure fluid above the valve disc 42 within the pressure chamber 46 rapidly vents to the low pressure region (not shown). With this occurrence, the force exerted by the high pressure fluid beneath the valve disc 42 adajcent the inlet 36 results in a net force unbalance acting in a direction 62 which moves the valve disc 42 from its seat 40 and permits the pressurized fluid near the inlet 36 to enter the valve chamber 44 and into the valve outlet 38. Thus, steam trapped downstream of the main turbine stop valve 24 and the throttle valve 26 is permitted an alternate escape route either to the condenser element 22 or to atmosphere, as indicated by reference arrows 30 and 32, respectively.

When the pressure beneath the valve disc 42 is insufficient to exert a force in direction 62 which maintains disc 42 away from the seat 40, the valve disc 42 would close. In the prior art, controlled closure of the valve disc 42 is accomplished by closing the first control valve and letting pressure within the pressure chamber above the valve disc equalize with the pressure beneath the valve disc. The weight of the valve disc itself, plus any pressure force unbalance due to a difference in effective areas over which the pressure force operates on the top and bottom surfaces of the disc 42, is sufficient to seat the disc. However, if friction is generated within the system between the seals 60 and the walls of the housing 34, the combination of the weight of the disc and the pressure force unbalance may not be sufficient to insure seating of the valve disc.

This invention provides a positive closure arrangement to insure seating of the valve disc 42 against its seat 40 after the dump function of the valve 12 has been accomplished. Utilizing the teachings of this invention, positive closure of the disc 42 is accomplished as follows. Upon appropriate signal from the control means (not shown), the first control valve 48 is closed so as to isolate the pressure chamber 46 from the low pressure region (not shown). Alternatively, upon closure of the first control valve 48, the second control valve 52 opens to permit communication between the pressure containment volume 50 and the pressure chamber 46. Opening of the second control valve 52 permits the entrapped high pressure fluid within the containment volume 50 to expand into the pressure chamber 46 above the valve disc 42. The force exerted by the introduction of high pressure fluid which was entrapped within the pressure containment volume 50 exerts a force on the valve disc 42 in a direction 64. The additional downward force exerted on the disc 42 by the high pressure fluid introduced into the pressure chamber 46 from the pressure containment volume 50 combines with the weight of the disc 42 and any pressure unbalance due to the difference in effective pressure surfaces above and below the valve disc 42 to insure proper seating of the valve disc 42 on its seat 40. Water which may have condensed from the high pressure fluid entrapped within the pressure containment volume 50 when such volume is isolated from the pressure chamber 46 can be withdrawn therefrom through the drain 54.

It can thus be appreciated that by provision of a pressure containment volume 50 which alternatively communicates with the pressure chamber 46 and which permits introduction of a high pressure fluid into the pressure chamber 46 exerts a force on the disc 42 which insures positive closure of the valve disc 42 on its valve seat 40.

I claim as my invention:

1. A free floating disc valve for ON-OFF control of an elastic fluid, said free floating disc valve comprising:
    a housing having an inlet port and an outlet port disposed therein,
    a valve disc movable within said housing from a seated position to a fully open position,
    said disc being so disposed within said housing to isolate said inlet port of said outlet port when said disc is in said seated position,
    said disc having an opening extending therethrough,
    a pressure chamber defined by the interior of said housing and said disc, so that when said disc is in its seated position, said elastic fluid passes through said opening in said disc and accumulates in said pressure chamber,
    containment means having a single opening through which said elastic fluid passes, said single opening being disposed in communication with said pressure chamber,
    means for venting said pressure chamber to a lower pressure region, and
    means for opening and shutting communication between said containment means and said pressure chamber,
    said opening and shutting means and said venting means being operable in such a manner that when said disc is seated and said venting means is closed, said means for opening and shutting communication between said containment means and said pressure chamber are open, allowing elastic fluids to fill said containment means, and when said venting means is open, said opening and shutting means are shut trapping elastic fluid in said containment means, whereby said disc moves from its seated position to its fully open position, and upon closing said venting means said opening and closing means opens thereby rapidly initiating movemnent of said disc from its fully open position to its seated positions.

2. The free floating disc valves for ON-OFF control of an elastic fluid as set forth in claim 1, wherein the open and shutting means comprise a first valve and the venting means comprises a second valves said valve being operable in such a manner that when one is open the other is closed.

* * * * *